(12) United States Patent
Zhao et al.

(10) Patent No.: US 9,805,757 B2
(45) Date of Patent: *Oct. 31, 2017

(54) HAMR NFT MATERIALS WITH IMPROVED THERMAL STABILITY

(71) Applicant: SEAGATE TECHNOLOGY LLC, Cupertino, CA (US)

(72) Inventors: Tong Zhao, Eden Prairie, MN (US); Michael Christopher Kautzky, Eagan, MN (US); William Albert Challener, Glenville, NY (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 13/867,179

(22) Filed: Apr. 22, 2013

(65) Prior Publication Data

US 2013/0235707 A1 Sep. 12, 2013

Related U.S. Application Data

(63) Continuation of application No. 13/032,709, filed on Feb. 23, 2011, now Pat. No. 8,427,925.

(Continued)

(51) Int. Cl.
*G11B 11/00* (2006.01)
*G11B 5/127* (2006.01)
(Continued)

(52) U.S. Cl.
CPC ............. *G11B 13/04* (2013.01); *B82Y 10/00* (2013.01); *G02B 6/102* (2013.01); *G11B 5/1278* (2013.01);
(Continued)

(58) Field of Classification Search
CPC ............ G11B 2005/0021; G11B 5/314; G11B 11/10543; G11B 11/10515;
(Continued)

(56) References Cited

U.S. PATENT DOCUMENTS 4,492,873 A 1/1985 Dmitriev
5,482,611 A 1/1996 Helmer
(Continued)

FOREIGN PATENT DOCUMENTS

EP 024088 10/1987
EP 0 580 368 A2 1/1994
(Continued)

OTHER PUBLICATIONS

Bannuru et al., "The Electrical and Mechanical Properties of Au-V and Au-V2O5 Thin Films for Wear-Resistant RF MEMS Switches", Journal of Applied Physics, 103, (2008), pp. 083522-1-083522-6.
(Continued)

*Primary Examiner* — Nabil Hindi
(74) *Attorney, Agent, or Firm* — Mueting, Raasch & Gebhardt, P.A.

(57) ABSTRACT

A near field transducer includes gold and at least one dopant. The dopant can include at least one of: Cu, Rh, Ru, Ag, Ta, Cr, Al, Zr, V, Pd, Ir, Co, W, Ti, Mg, Fe, or Mo. The dopant concentration may be in a range from 0.5% and 30%. The dopant can be a nanoparticle oxide of V, Zr, Mg, Ca, Al, Ti, Si, Ce, Y, Ta, W, or Th, or a nitride of Ta, Al, Ti, Si, In, Fe, Zr, Cu, W or B.

20 Claims, 12 Drawing Sheets

Related U.S. Application Data

(60) Provisional application No. 61/307,133, filed on Feb. 23, 2010.

(51) Int. Cl.
    *G11B 13/04*     (2006.01)
    *B82Y 10/00*     (2011.01)
    *G02B 6/10*     (2006.01)
    *G11B 5/31*     (2006.01)
    *G11B 5/00*     (2006.01)
    *G11B 5/60*     (2006.01)

(52) U.S. Cl.
    CPC ............ *G11B 5/314* (2013.01); *G11B 5/6088* (2013.01); *G11B 2005/0021* (2013.01); *Y10T 428/11* (2015.01)

(58) Field of Classification Search
    CPC ........ G11B 11/0595; G11B 2005/0005; G11B 5/3903; B82Y 25/00; B82Y 10/00; B82Y 20/00; G01B 11/24; G02B 21/244
    USPC ....... 369/13.33, 13.32, 13.24, 13.02, 112.23; 356/601, 445; 360/59, 313, 125.31; 250/201.3; 385/129.31
    See application file for complete search history.

(56) References Cited

U.S. PATENT DOCUMENTS

| | | | |
|---|---|---|---|
| 5,849,093 A | 12/1998 | Andra |
| 5,945,681 A | 8/1999 | Tokiguchi |
| 6,130,436 A | 10/2000 | Renau |
| 6,144,098 A | 11/2000 | Iyer |
| 6,589,676 B1 | 7/2003 | Gui |
| 6,632,483 B1 | 10/2003 | Callegari |
| 6,641,932 B1 | 11/2003 | Xu |
| 6,683,426 B1 | 1/2004 | Kleeven |
| 6,795,630 B2 | 9/2004 | Challener |
| 6,999,384 B2 | 2/2006 | Stancil |
| 7,002,228 B2 | 2/2006 | Deak |
| 7,018,729 B2 | 3/2006 | Pocker |
| 7,032,427 B2 | 4/2006 | Niwa |
| 7,262,936 B2 | 8/2007 | Hamann |
| 7,272,079 B2 | 9/2007 | Challener |
| 7,330,404 B2 | 2/2008 | Peng |
| 7,377,228 B2 | 5/2008 | Mack |
| 7,476,855 B2 | 1/2009 | Huang |
| 7,538,978 B2 | 5/2009 | Sato |
| 7,544,958 B2 | 6/2009 | Low |
| 7,609,003 B2 | 10/2009 | Horsky |
| 7,690,009 B2 | 3/2010 | Miyanishi |
| 7,791,839 B2 | 9/2010 | Olson |
| 7,961,417 B2 | 6/2011 | Seigler |
| 7,965,464 B2 | 6/2011 | Batra |
| 7,986,592 B2 | 7/2011 | Hirano |
| 8,023,225 B2 | 9/2011 | Shimazawa |
| 8,031,561 B2 | 10/2011 | Hellwig |
| 8,040,761 B2 | 10/2011 | Kawamori |
| 8,077,556 B2 | 12/2011 | Komura |
| 8,107,325 B2 | 1/2012 | Komura |
| 8,116,176 B2 | 2/2012 | Kato |
| 8,194,510 B2 | 6/2012 | Sasaki |
| 8,194,511 B2 | 6/2012 | Sasaki |
| 8,213,272 B2 | 7/2012 | Takayama |
| 8,223,597 B2 | 7/2012 | Komura |
| 8,248,891 B2 | 8/2012 | Lee |
| 8,284,521 B2 | 10/2012 | Ohtsu |
| 8,284,635 B2 | 10/2012 | Matsumoto |
| 8,289,650 B2 | 10/2012 | Seigler |
| 8,320,220 B1 | 11/2012 | Yuan |
| 8,325,567 B2 | 12/2012 | Miyauchi |
| 8,331,205 B2 | 12/2012 | Seigler |
| 8,339,740 B2 | 12/2012 | Zou |
| 8,351,151 B2 | 1/2013 | Katine |
| 8,385,159 B2 | 2/2013 | Gao |
| 8,400,902 B2 | 3/2013 | Huang |
| 8,405,056 B2 | 3/2013 | Amaldi |
| 8,405,932 B2 | 3/2013 | Seigler |
| 8,416,647 B1 | 4/2013 | Zhao |
| 8,427,925 B2 | 4/2013 | Zhao |
| 8,451,555 B2 | 5/2013 | Seigler |
| 8,451,705 B2 | 5/2013 | Peng et al. |
| 8,477,454 B2 | 7/2013 | Zou |
| 8,514,673 B1 | 8/2013 | Zhao |
| 8,553,505 B2 | 10/2013 | Rawat |
| 8,670,215 B2 | 3/2014 | Zou |
| 8,675,457 B1 | 3/2014 | Hirata |
| 8,711,662 B2 | 4/2014 | Lee |
| 8,773,959 B2 | 7/2014 | Gao et al. |
| 8,830,800 B1 | 9/2014 | Pitcher |
| 8,917,581 B1 | 12/2014 | Mallary |
| 8,934,198 B2 | 1/2015 | Zou |
| 8,958,168 B1 | 2/2015 | Yuan |
| 9,058,824 B2 | 6/2015 | Cheng |
| 9,245,573 B2 | 1/2016 | Sahoo |
| 2005/0012052 A1 | 1/2005 | Platzgummer |
| 2005/0190496 A1 | 9/2005 | Hamann |
| 2006/0238133 A1 | 10/2006 | Horsky |
| 2007/0069383 A1 | 3/2007 | Suzuki |
| 2008/0230724 A1 | 9/2008 | Low |
| 2009/0073858 A1 | 3/2009 | Seigler |
| 2009/0130365 A1 | 5/2009 | Kojima |
| 2009/0225636 A1 | 9/2009 | Hirano |
| 2010/0103553 A1 | 4/2010 | Shimazawa |
| 2010/0123965 A1 | 5/2010 | Lee |
| 2010/0123967 A1 | 5/2010 | Batra |
| 2010/0128579 A1 | 5/2010 | Seigler |
| 2010/0149930 A1 | 6/2010 | Komura |
| 2010/0157746 A1 | 6/2010 | Hongo |
| 2010/0190036 A1 | 7/2010 | Komvopoulos |
| 2010/0214685 A1 | 8/2010 | Seigler |
| 2010/0309581 A1 | 12/2010 | Wu |
| 2010/0315736 A1 | 12/2010 | Takayama |
| 2010/0320403 A1 | 12/2010 | Amaldi |
| 2010/0329085 A1 | 12/2010 | Kawamori |
| 2011/0006214 A1 | 1/2011 | Bonig |
| 2011/0026161 A1 | 2/2011 | Ikeda |
| 2011/0038236 A1 | 2/2011 | Mizuno |
| 2011/0058272 A1 | 3/2011 | Miyauchi |
| 2011/0096431 A1 | 4/2011 | Hellwig |
| 2011/0122735 A1 | 5/2011 | Kato |
| 2011/0205863 A1 | 8/2011 | Zhao |
| 2012/0045662 A1 | 2/2012 | Zou |
| 2012/0105996 A1 | 5/2012 | Katine |
| 2012/0127839 A1 | 5/2012 | Rawat |
| 2012/0163139 A1 | 6/2012 | Vavra |
| 2012/0201491 A1 | 8/2012 | Zhou |
| 2012/0213042 A1 | 8/2012 | Aoki |
| 2013/0107679 A1 | 5/2013 | Huang |
| 2013/0108212 A1 | 5/2013 | Peng |
| 2013/0161505 A1 | 6/2013 | Pitcher |
| 2013/0164453 A1 | 6/2013 | Pitcher |
| 2013/0164454 A1 | 6/2013 | Pitcher |
| 2013/0176839 A1 | 7/2013 | Peng |
| 2013/0235707 A1 | 9/2013 | Zhao |
| 2013/0279315 A1 | 10/2013 | Zhao |
| 2013/0286799 A1 | 10/2013 | Zhu |
| 2013/0286804 A1 | 10/2013 | Zhao |
| 2013/0288077 A1 | 10/2013 | Dhawan |
| 2014/0004384 A1 | 1/2014 | Zhao |
| 2014/0043948 A1 | 2/2014 | Hirata |
| 2014/0050057 A1 | 2/2014 | Zou |
| 2014/0050058 A1 | 2/2014 | Zou |
| 2014/0113160 A1 | 4/2014 | Pitcher |
| 2014/0177405 A1 | 6/2014 | Rejda |
| 2014/0254335 A1 | 9/2014 | Gage |
| 2014/0376349 A1 | 12/2014 | Cheng |
| 2014/0376350 A1 | 12/2014 | Cheng |
| 2014/0376351 A1 | 12/2014 | Cheng |
| 2014/0376352 A1 | 12/2014 | Cheng |
| 2015/0132503 A1 | 5/2015 | Kautzky |
| 2015/0162028 A1 | 6/2015 | Jayashankar |

(56) References Cited

U.S. PATENT DOCUMENTS

| | | | |
|---|---|---|---|
| 2015/0179194 A1 | 6/2015 | Cheng |
| 2015/0340052 A1 | 11/2015 | Sankar |
| 2016/0133279 A1 | 5/2016 | Zhao |

FOREIGN PATENT DOCUMENTS

| | | |
|---|---|---|
| EP | 0942072 | 9/1999 |
| EP | 1328027 | 7/2003 |
| EP | 2106678 | 10/2009 |
| JP | 2011198450 | 10/2011 |
| JP | 20111238991 | 12/2011 |
| TW | 200929183 | 7/2009 |
| WO | WO 97/45834 | 12/1997 |
| WO | WO 2013/163195 | 10/2013 |
| WO | WO 2013/163470 | 10/2013 |

OTHER PUBLICATIONS

Williams et al., "Strenghtening Gold Thin Films with Zirconia Nanoparticles for MEMS Electrical Contacts", Acta Materialia 56, (2008), pp. 1813-1819.
U.S. Appl. No. 13/923,925, filed Jun. 21, 2013, Pitcher.
U.S. Appl. No. 14/062,651, filed Oct. 24, 2013, Zou.
Al-Bayati et al., Junction Profiles of Sub keV Ion Implantation for Deep Sub-Quarter Micron Devices, *IEEE*, 2000, pp. 87-90.
Angel et al., "Enhanced Low Energy Drift-Mode Beam Currents in a High Current Ion Implanter," *IEEE*, 1999, pp. 219-222.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.
Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.
Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.
Piazza et al., "Large Area Deposition of Hydrogenated Amorphous Carbon Films for Optical Storage Disks", Diamond and Related Materials, vol. 13, No. 4-8, Apr. 2004, pp. 1505-1510.
Robertson, J., "Diamond-Like Amorphous Carbon," *Materials Science and Engineering R 37*, 2002, pp. 129-281.
Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.
Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.
PCT/US2013/038120 Search Report and Written Opinion dated Jul. 19, 2013 (8 pages).
PCT International Search Report and Written Opinion for PCT/US2015/059671 dated Mar. 31, 2016 (12 pages).
Challener et al., "Heat-Assisted Magnetic Recording by a Near-Field Transducer with Efficient Optical Energy Transfer," *Journal of Applied Physics*, Mar. 22, 2009.
Weller et al., "A HAMR Media Technology Roadmap to an Areal Density of 4 Tb/in$^2$", *IEEE Transactions on Magnetics*, vol. 50, No. 1, Jan. 2014.

HAMR NFT MATERIALS WITH IMPROVED THERMAL STABILITY

CROSS REFERENCE TO RELATED APPLICATION

This is a continuation application of U.S. patent application Ser. No. 13/032,709, filed Feb. 23, 2011, which issued on Apr. 23, 2013 as U.S. Pat. No. 8,427,925, which claims the benefit of U.S. Provisional Patent Application No. 61/307,133, filed Feb. 23, 2010, and titled "HAMR NFT Materials with Improved Thermal Stability", the disclosures of which are hereby incorporated by reference.

BACKGROUND

In heat assisted magnetic recording, information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot on the storage medium to heat a portion of the medium and reduce the magnetic coercivity of the heated portion. Data is then written to the reduced coercivity region.

One example of a recording head for use in heat assisted magnetic recording includes a near field transducer (NFT) that is capable of focusing light to a spot size smaller than the diffraction limit. The NFT is designed to reach local surface-plasmon resonance at a designed light wavelength. At resonance, a high electric field surrounding the NFT appears, due to the collective oscillation of electrons in the metal. A portion of the field will tunnel into a storage medium and get absorbed, raising the temperature of the medium locally for recording.

The NFT's temperature significantly increases at plasmonic resonance. In addition, a portion of the NFT may be exposed at the air bearing surface of the recording head and is thus subject to mechanical wearing. NFT performance is greatly influenced by the heat and mechanical stress during HAMR operation. Gold (Au) is currently used as the primary NFT material due to its superior optical properties. However, gold has a relatively low mechanical strength and gold NFT's may experience reflow at elevated temperatures resulting in rounding of the NFT shape. A deformation in shape can reduce coupling efficiency and reduce the amount of light energy transferred to the storage medium.

It would be desirable to have an NFT device that would be more durable for repeated HAMR operations.

SUMMARY

In one aspect, the disclosure provides a near field transducer including gold and at least one Cu, Rh, Ru, Ag, Ta, Cr, Al, Zr, V, Pd, Ir, Co, W, Ti, Mg, Fe or Mo dopant.

In another aspect, the disclosure provides a near field transducer including gold and at least one nanoparticle oxide or nitride dopant.

In another aspect, the disclosure provides apparatus including a storage medium, a recording head comprising a near field transducer and a waveguide configured to direct light onto the near field transducer, wherein the near field transducer includes gold and at least one dopant, and an arm for positioning the recording head adjacent to the storage medium.

These and other features and advantages which characterize the various embodiments of the present disclosure can be understood in view of the following detailed discussion and the accompanying drawings.

DETAILED DESCRIPTION OF THE INVENTION

In one aspect, this disclosure provides a near field transducer (NFT) that can be used in a HAMR recording head. The NFT includes materials that show enhanced hardness and higher resistance to stress relaxation and creep properties than pure gold, while still possessing acceptable optical properties. In several examples, such materials include Au with various doping elements or compounds.

Figure 1:
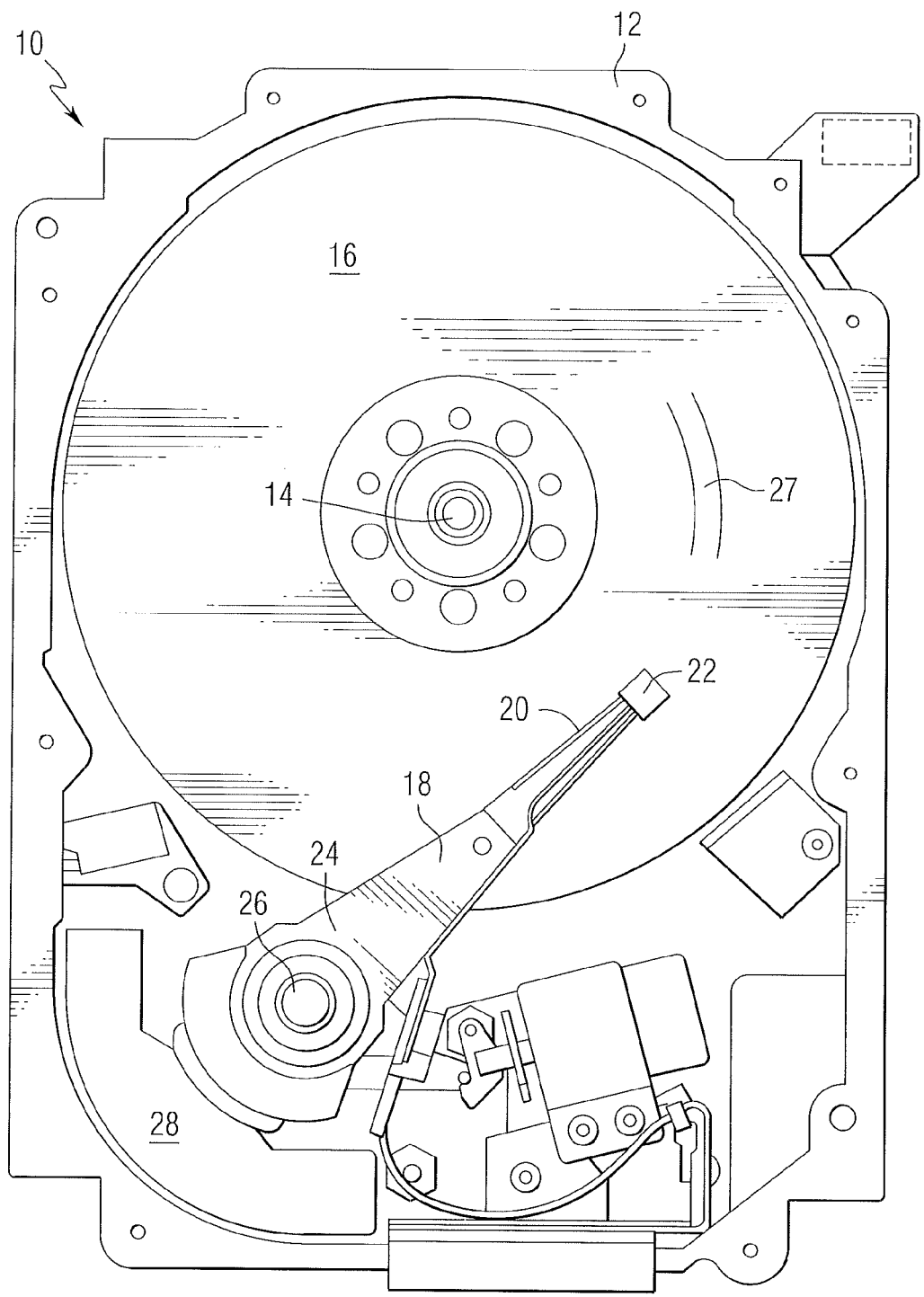
FIG. 1 is a pictorial representation of a data storage device in the form of a disc drive that can include a recording head constructed in accordance with an aspect of this disclosure.

This disclosure encompasses NFTs and devices that include such NFTs. FIG. 1 is a pictorial representation of a data storage device in the form of a disc drive 10 that can utilize NFTs constructed in accordance with various aspects of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. While FIG. 1 shows a disc drive, the invention can be applied to other devices that include a near field transducer.

Figure 2:
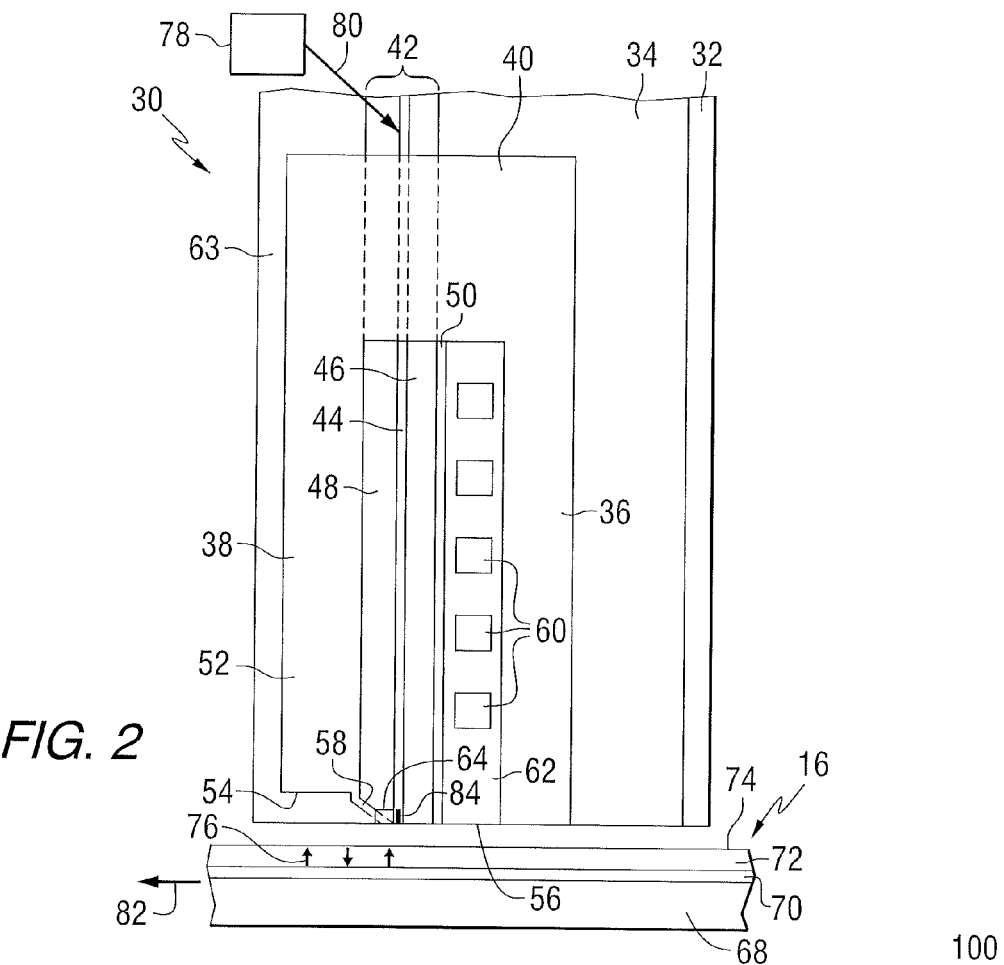
FIG. 2 is a side elevation view of a recording head constructed in accordance with an aspect of the invention.

FIG. 2 is a side elevation view of a recording head constructed in accordance with an aspect of the disclosure, and positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Figure 3:
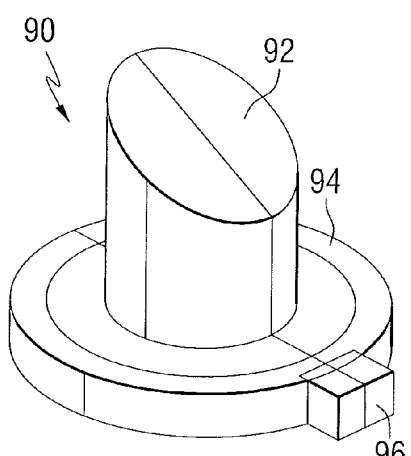
FIG. 3 is a schematic representation of a near field transducer.

FIG. 3 is a schematic view of a lollypop NFT 90 in combination with a heat sink 92. The NFT includes a disk shaped portion 94 and a peg 96 extending from the disk shaped portion. The heat sink 92 can be positioned between the disk shaped portion and the sloped portion of the top pole in FIG. 2. When mounted in a recording head, the peg may be exposed at the ABS and thus is subject to mechanical wearing.

Figure 4:
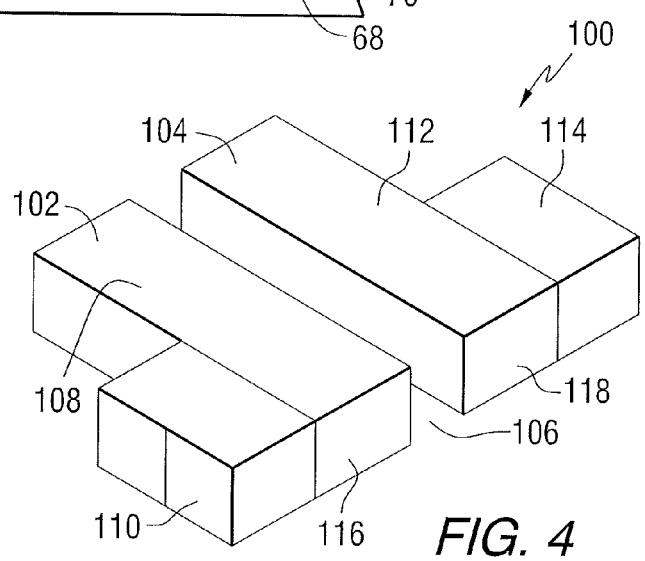
FIG. 4 is a schematic representation of another near field transducer.

FIG. 4 is a schematic view of a coupled nanorod (CNR) NFT 100. This NFT includes two nanorods 102 and 104 separated by a gap 106. Nanorod 102 includes a first portion 108 and a second portion 110. Nanorod 104 includes a first portion 112 and a second portion 114. When mounted in a recording head, the ends 116 and 118 of the nanorods may be exposed at the ABS and thus be subject to mechanical wearing.

FIGS. 3 and 4 show example NFTs. However, the disclosure is not limited to any particular type of NFT. The materials described below may be used in various NFT configurations. When used in a recording head, NFTs may have an end positioned at or near the air bearing surface.

In this disclosure, a set of material properties, namely plastic deformation, stress relaxation, and creep, have been identified as causes of NFT failure. This disclosure describes a set of materials that show enhanced hardness and higher resistance to stress relaxation and creep. At the same time, these materials possess acceptable optical properties for use in NFT's.

Due to the complexity in testing a NFT device during a HAMR operation, it would be desirable to set up selection criteria for NFT materials at the sheet film level. Table I shows the physical properties of different materials. Among the plasmonic materials possible for use in an NFT, gold (Au) has among the lowest hardness and softening temperature. Also grain boundaries of Au are highly mobile and can lead to stress relaxation, creep, and thus plastic mechanical failure.

TABLE I

Materials Properties

| Material | Optical @ 830 nm | | | Thermal Conductivity (W/mC) | CTE ($\times 10^{-6}$/K) | Brinell Hardness | Temperature (° C.) | |
|---|---|---|---|---|---|---|---|---|
| | n | k | $(n^2 - k^2)/nk$ | | | | Softening | Melting |
| Ag | 0.15 | 5.52 | −36.77 | 418 | | 25 | 180 | 960 |
| Au | 0.19 | 5.42 | −28.49 | 310 | 14.2 | 20 | 100 | 1063 |
| Cu | 0.26 | 5.29 | −20.30 | 380 | 16.5 | 35 | 190 | 1083 |

TABLE I-continued

Materials Properties

| Material | Optical @ 830 nm | | | Thermal Conductivity (W/mC) | CTE ($\times 10^{-6}$/K) | Brinell Hardness | Temperature (° C.) | |
|---|---|---|---|---|---|---|---|---|
| | n | k | $(n^2 - k^2)/nk$ | | | | Softening | Melting |
| Ta | 1.09 | 3.75 | −3.15 | 545 | | 40 | 800 | 2996 |
| Al | 2.72 | 8.29 | −2.72 | 210 | | 27 | 150 | 657 |
| Rh | 2.78 | 6.97 | −2.11 | 88 | 8.5 | 55 | 1966 | 1966 |
| Pd | 2.09 | 5.22 | −2.10 | 70 | | 32 | — | 1554 |
| Ir | 2.65 | 5.39 | −1.54 | 60 | | 170 | — | 2450 |
| Co | 2.54 | 4.91 | −1.42 | 69 | | 125 | — | 1495 |
| Pt | 2.93 | 5.08 | −1.16 | 70 | | 40 | 540 | 1773 |
| Fe | 2.94 | 3.41 | −0.30 | 60 | | 67 | 500 | 1540 |
| Mo | 3.53 | 3.30 | 0.13 | 140 | | 250 | 900 | 2620 |
| W | 3.48 | 2.79 | 0.45 | 190 | | 350 | 1000 | 3390 |
| Ru | 4.98 | 3.88 | 0.50 | 110 | | 193 | — | 2500 |

Figure 5:
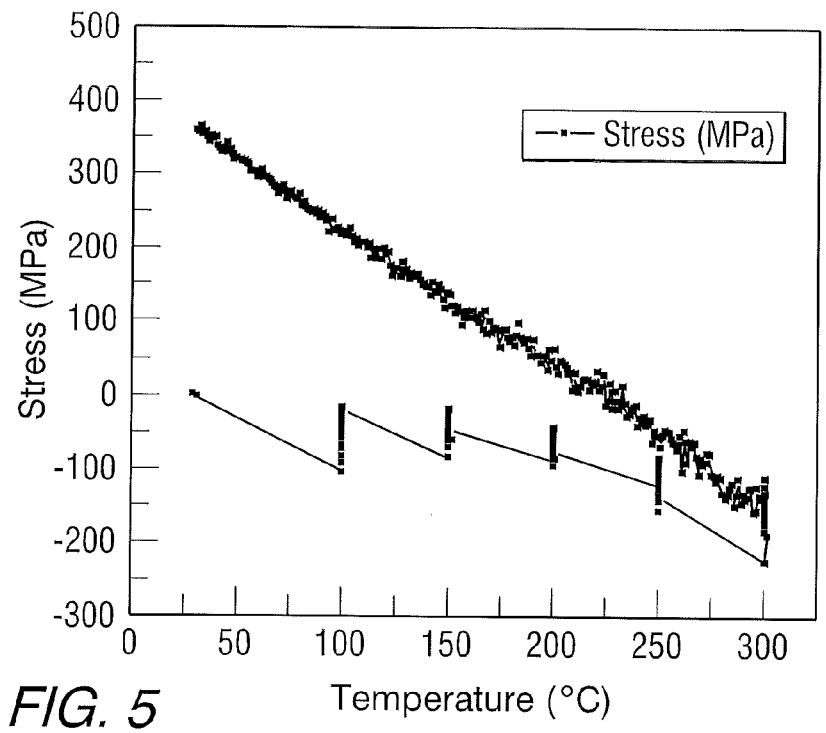
FIG. 5 is a graph of stress versus temperature.
Figure 6:
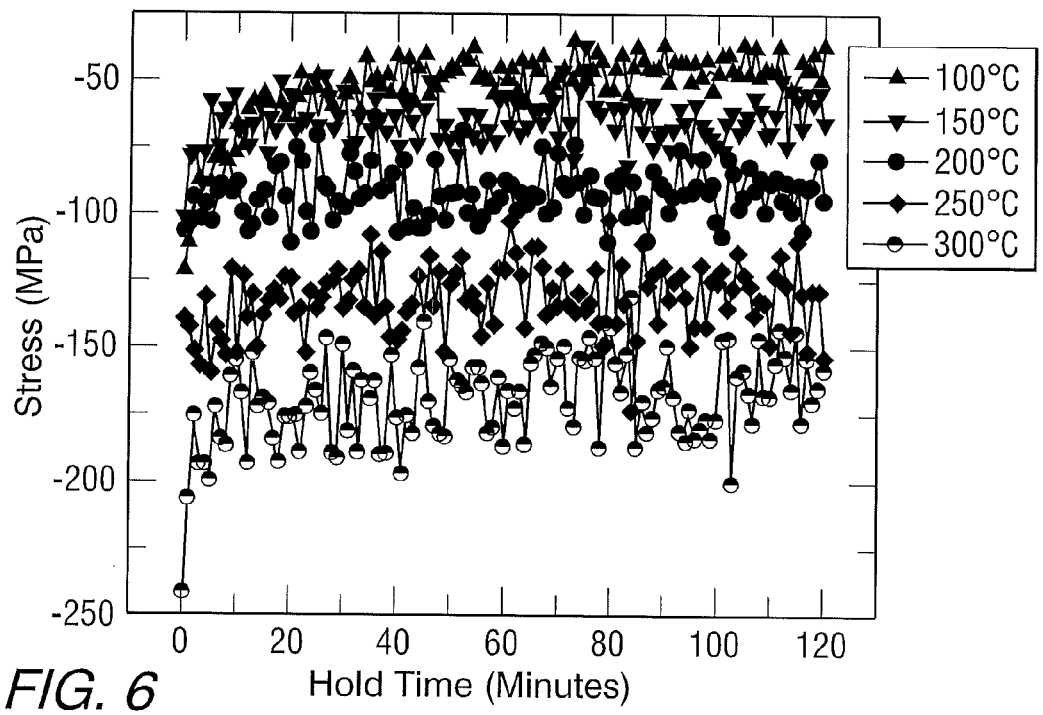
FIG. 6 is a graph of stress versus hold time.
Figure 7:
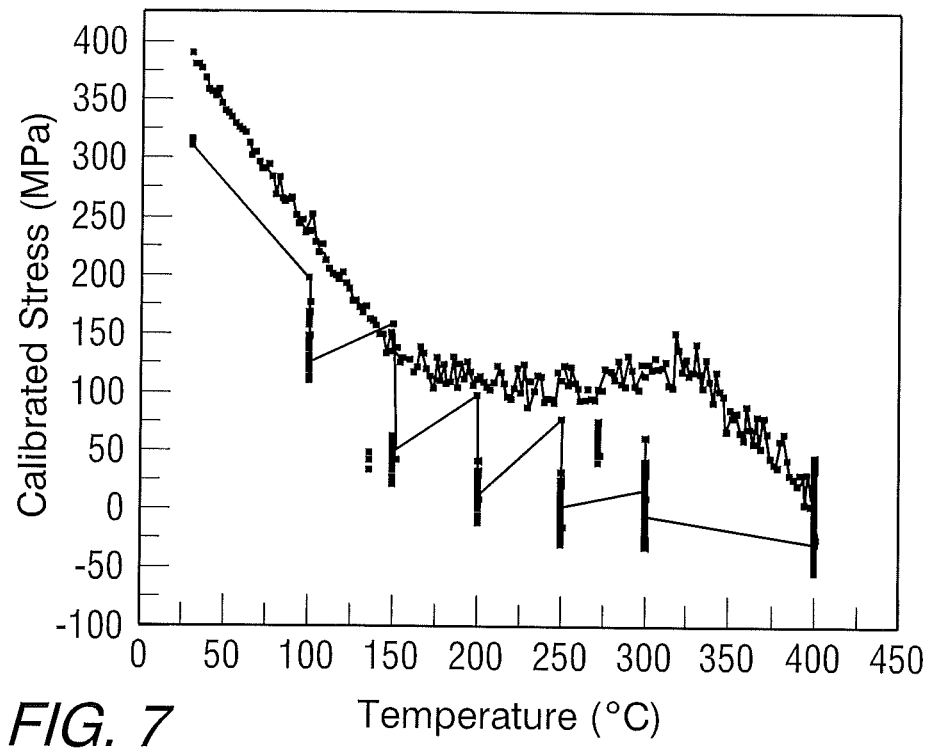
FIG. 7 is a graph of stress versus temperature.

FIG. 5 shows stress data taken on an Au film grown on a silicon (Si) substrate. Due to thermal mismatch between the Au and the Si wafer, compressive stress is developed in the Au film when the structure is heated as shown in FIG. 5. Hysteresis between the heating and cooling curves indicates that plastic deformation occurred in the Au film during heating. The lowest temperature at which Au starts to deform plastically is easily revealed by holding the Au film at certain temperatures and measuring its stress evolution as a function of hold time, as shown in FIG. 6. It is found that stress starts to relax in Au at as low as 100° C. due to grain growth or other defect migrations. Furthermore, similar stress relaxation can still be measured in pure Au film even after pre-annealing at 400° C. for 2 hours that is enough for grain growth to be settled, as shown in FIG. 7. All of the mechanical properties mentioned above for pure Au can contribute to NFT failure modes.

FIGS. 5 and 6 show results for as-grown pure Au film, wherein stress was measured as a function of temperature or hold time at a certain temperature. The sample was heated quickly to a desired temperature and then held there for 2 hours. FIG. 5 shows stress vs. temperature for the entire measurement period. FIG. 6 shows stress vs. time at each holding temperature.

Figure 8:
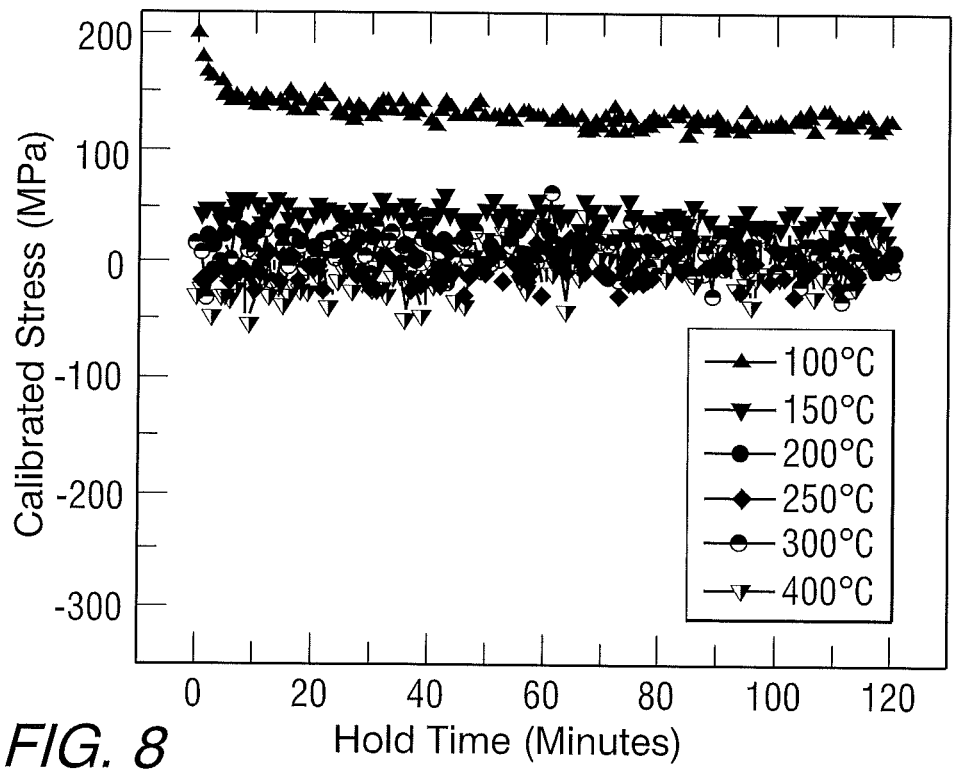
FIG. 8 is a graph of stress versus hold time.

FIGS. 7 and 8 show results for pure Au film pre-annealed at 400° C. for 2 hours, wherein the stress was measured as a function of temperature or hold time at a certain temperature. The sample was heated quickly to a desired temperature and then held there for 2 hours. FIG. 7 shows stress vs. temperature for the entire measurement period. FIG. 8 shows stress vs. time at each holding temperature. FIGS. 5 and 6 show that Au undergoes plastic deformation during heating, with stress relaxation occurring at as low as 100° C. Even after annealing at 400° C. for 2 hours, similar stress relaxation can still be measured as illustrated in FIGS. 7 and 8. This is a strong measure of creep, which causes plastic deformation that can result in a failure of NFT.

It is known that Au can be hardened through alloying with other metals or through oxide, or nitride, dispersion with nanoparticles. But usually doping degrades the optical property of Au and thus the NFT coupling efficiency. In the following embodiments, Au has been combined with various doping materials that have been carefully selected to not only improve the above mentioned mechanical properties but also keep the optical properties within an acceptable range for NFT operation.

In one embodiment that employs solid solution hardening, Au is co-sputtered with one of the following elements: Cu, Rh, Ru, V or Zr, or an Au alloy is deposited directly from an alloy target, on Si substrates at room temperature. The doping level varies between 0.5% and 30% and the film thickness varies between 150 nm and 300 nm. The Au alloy may include Au and at least one of: Cu, Rh, Ru, Ag, Ta, Cr, Al, Zr, V, Pd, Ir, Co, W, Ti, Mg, Fe and Mo. In other embodiments, the film thickness can be as low as 10 nm.

Figure 9:
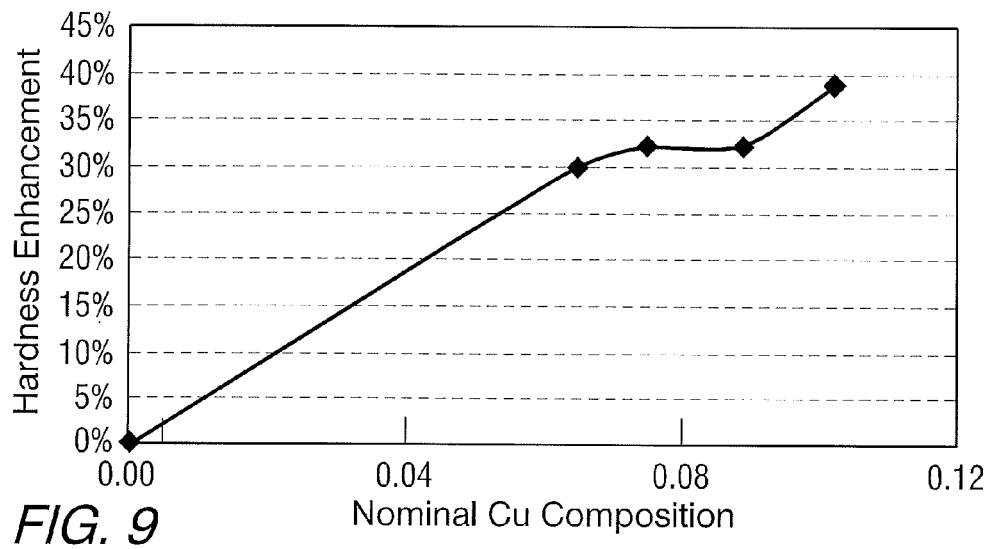
FIG. 9 is a graph of hardness enhancement versus copper composition.

Hardness of the Au alloy films have been measured by nanoindentation and compared with that from pure Au. FIG. 9 shows hardness enhancement to pure Au by Cu doping as a function of Cu concentration. As can be seen, Au hardness has been enhanced by 30 to 40% depending on the doping level. NFT's constructed of these alloys would then be more resistant to plastic deformation and wear.

Figure 10:
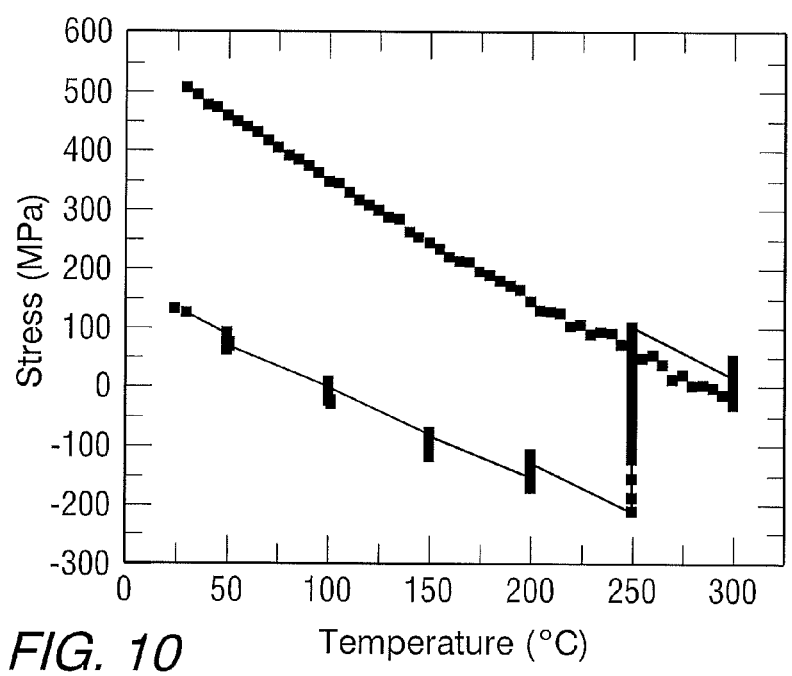
FIG. 10 is a graph of stress versus temperature.
Figure 11:
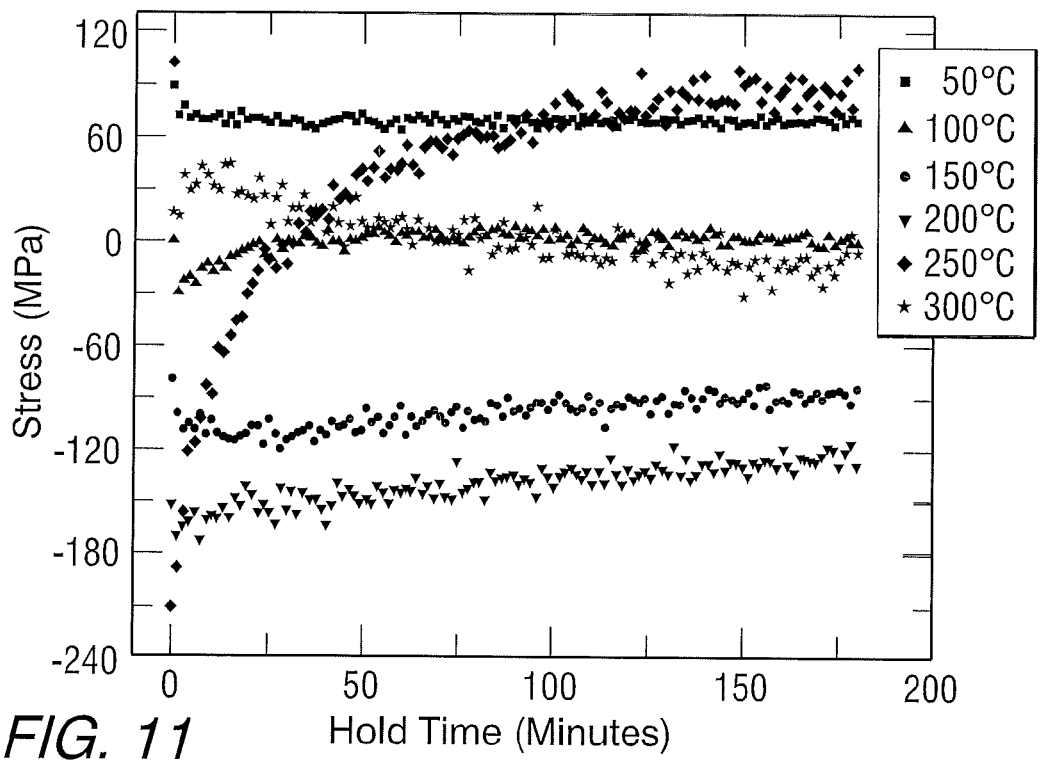
FIG. 11 is a graph of stress versus hold time.

In addition to hardness enhancement, the Au alloy films also show higher stress relaxation temperature. FIGS. 10 and 11 show data for as-grown AuRh 1.8% film, wherein stress was measured as a function of temperature or hold time at a certain temperature. The sample was heated quickly to a desired temperature and then held there for 3 hours. FIG. 10 shows stress vs. temperature for the entire measurement period. FIG. 11 shows stress vs. time at each holding temperature. As shown in FIGS. 10 and 11, in AuRh 1.8% film, stress relaxation doesn't happen until 250° C., which is 150° C. higher than pure Au. The higher stress relaxation temperature is also evidenced by comparing the grain size and its evolution between Au and AuRh films. In the as-grown films, AuRh has finer grain size than Au to begin with. With annealing, grain size increases in both cases. However, in pure Au, significant grain growth is measured at 300° C.; while in AuRh the grain size is just a little larger than that at room temperature. In general, smaller grain size translates into higher hardness, because dislocation migration is retarded by more grain boundaries. TEM data suggests that the microstructure of AuRh is more stable than that of Au and thus is more robust to heat treatment.

Figure 12:
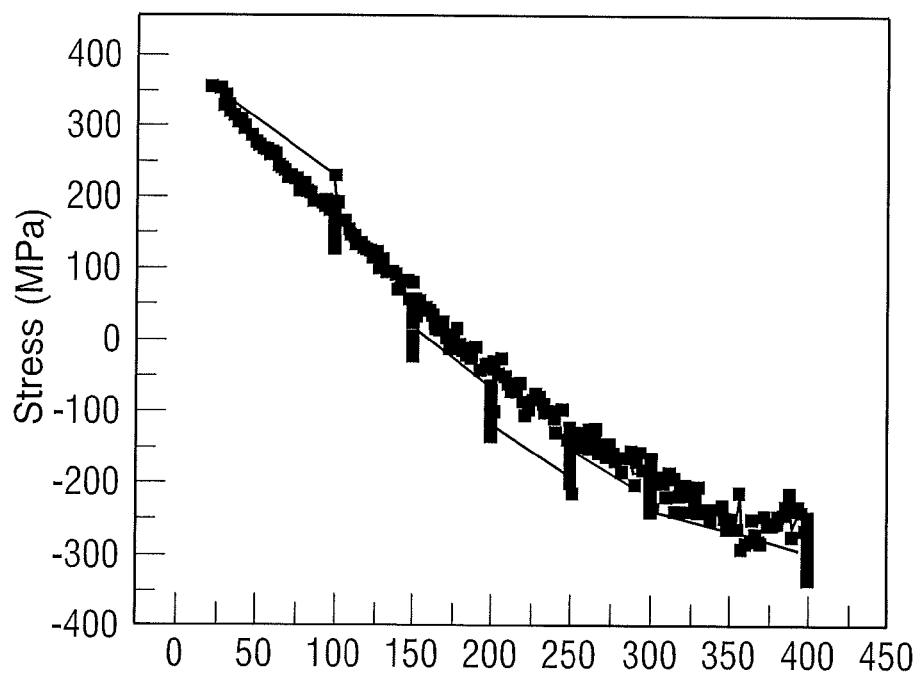
FIG. 12 is a graph of stress versus temperature.
Figure 13:
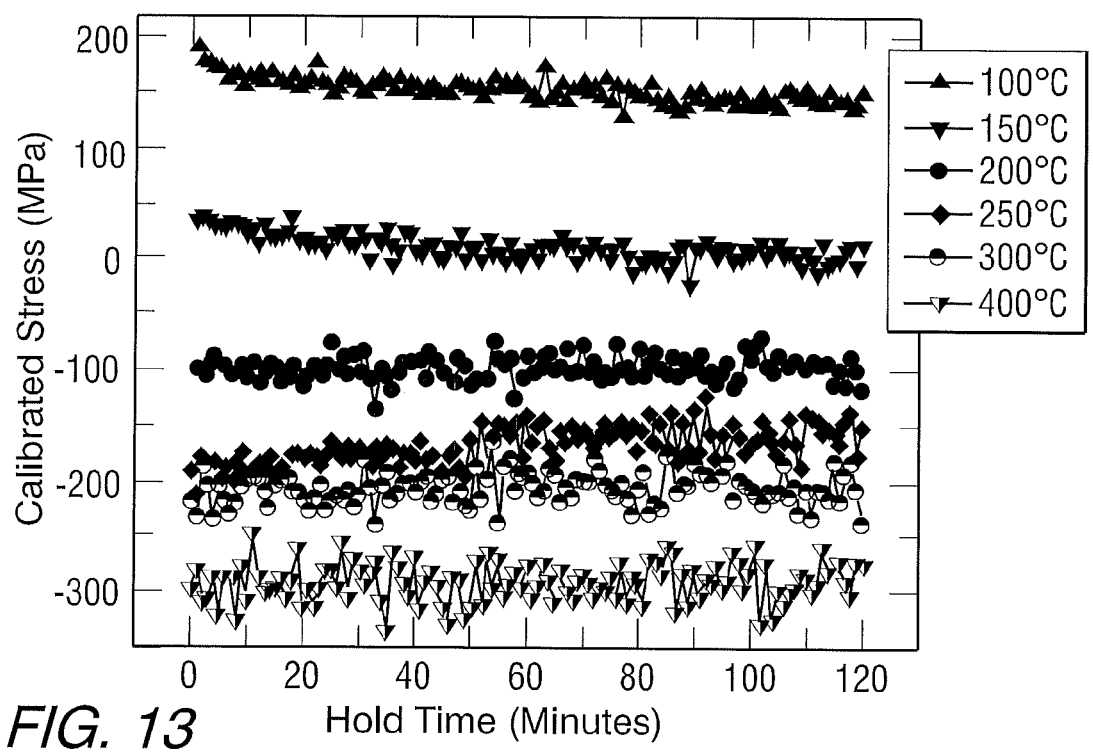
FIG. 13 is a graph of stress versus hold time.

Furthermore, AuRh films also show increased creep resistance. FIGS. 12 and 13 show data for AuRh 1.8% film pre-annealed at 400° C. for 2 hours, wherein stress was measured as a function of temperature or hold time at a certain temperature. The sample was heated quickly to a desired temperature and then held there for 2 hours. FIG. 12 shows stress vs. temperature for the entire measurement period. FIG. 13 shows stress vs. time at each holding temperature. As shown in FIG. 12, straight-line stress vs. temperature curve without hysteresis between heating and cooling is measured on AuRh film after being annealed at 400° C. for 2 hours. Stress vs. time curves at each holding temperature (FIG. 13) show that no stress relaxation happened. These data indicate that Rh doping enhances creep resistance of Au.

Figure 14:
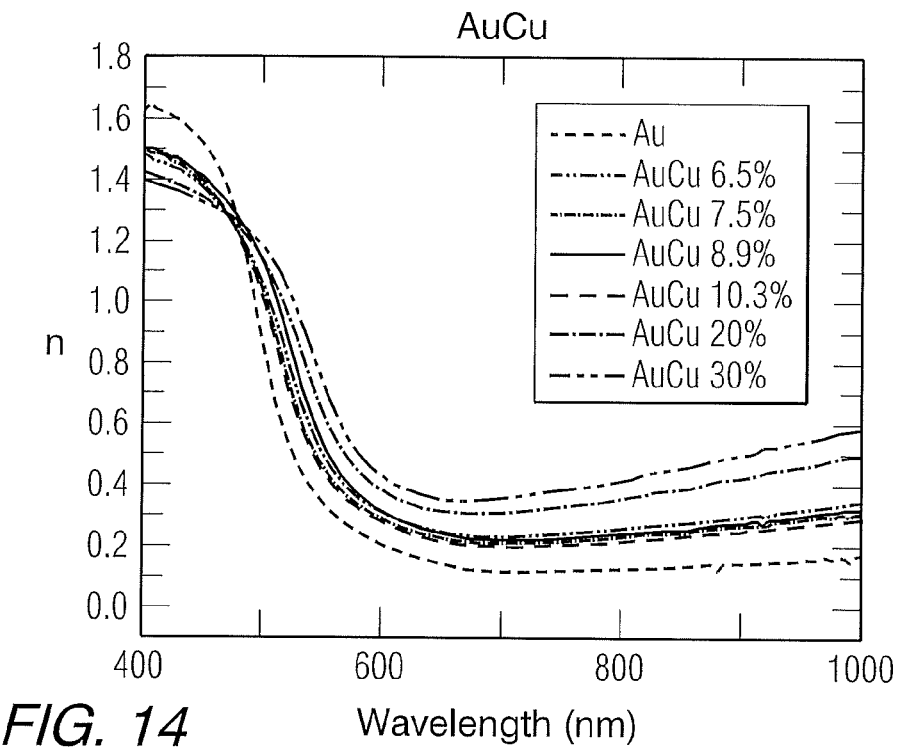
FIGS. 14, 15 and 16 are graphs of refractive index versus wavelength.
Figure 15:
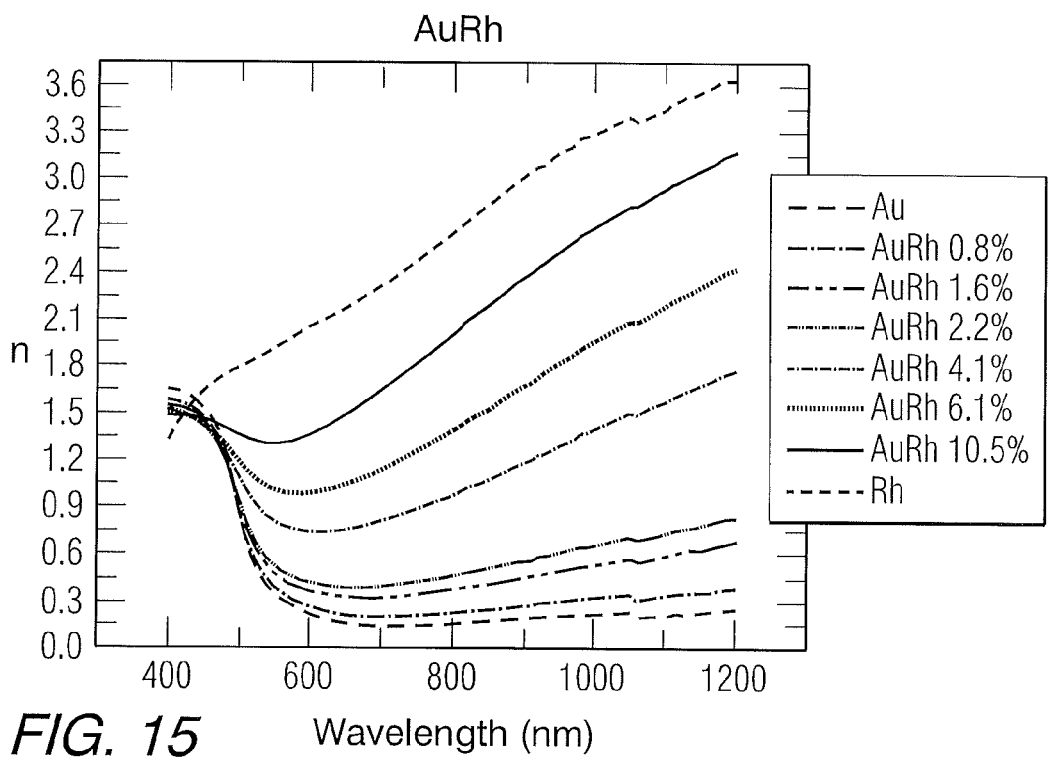
Figure 16:
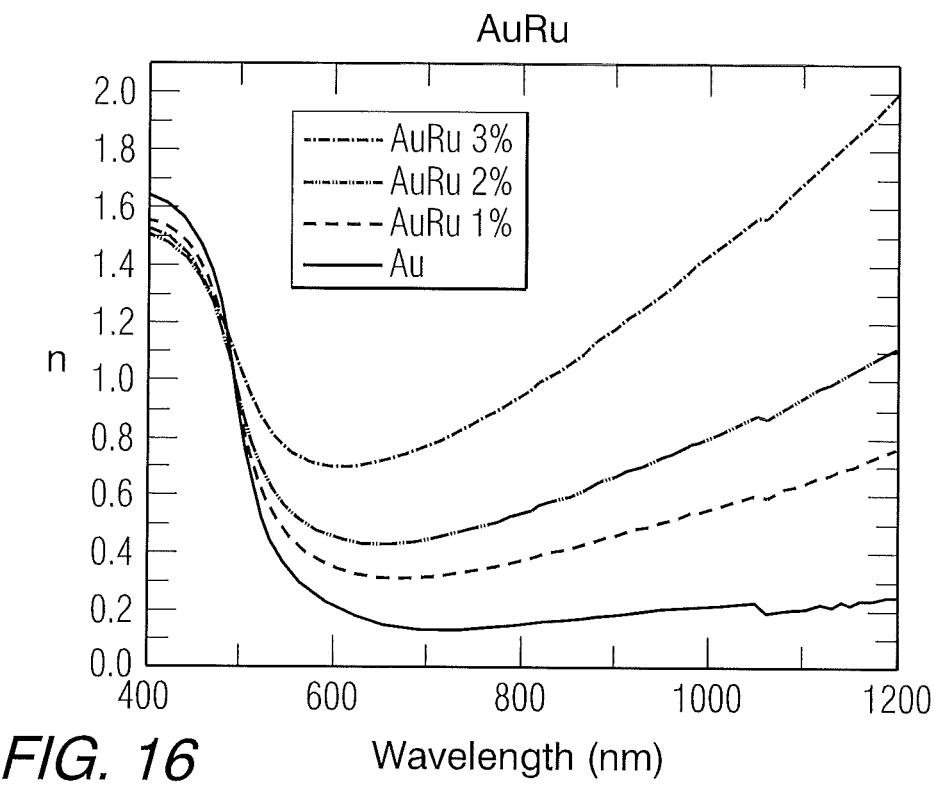
Figure 17:
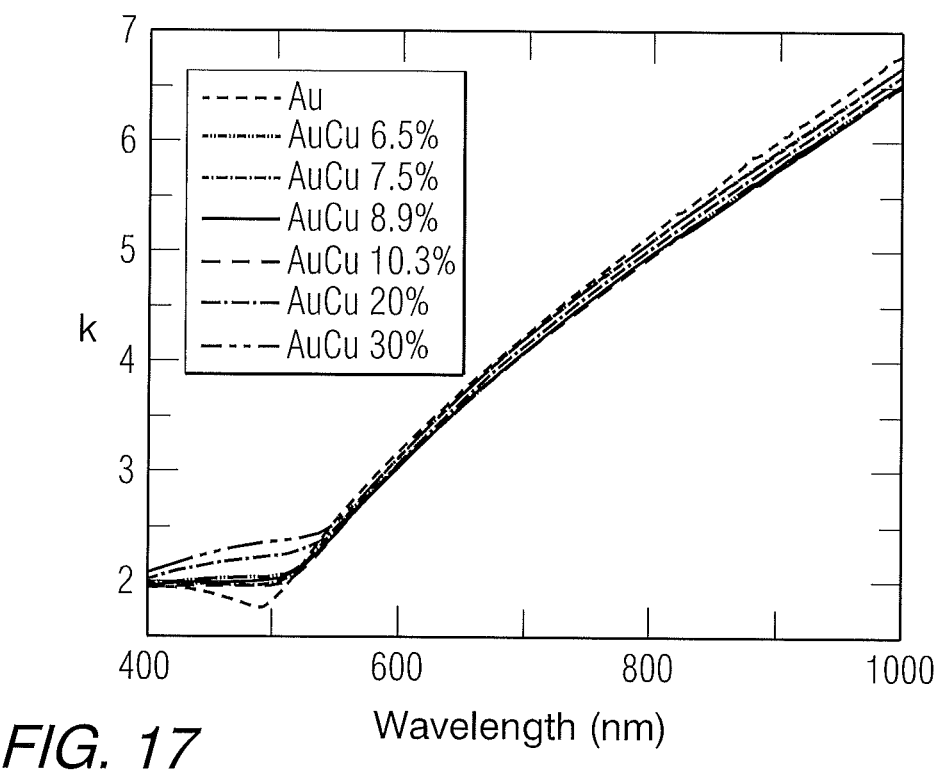
FIGS. 17, 18 and 19 are graphs of extinction coefficient versus wavelength.
Figure 18:
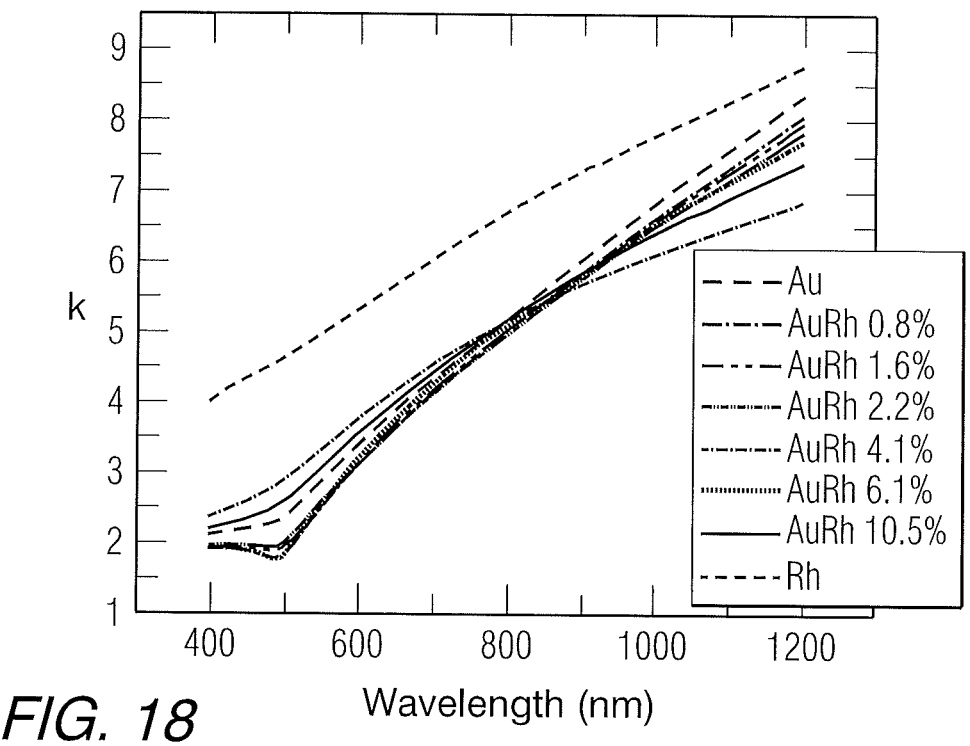
Figure 19:
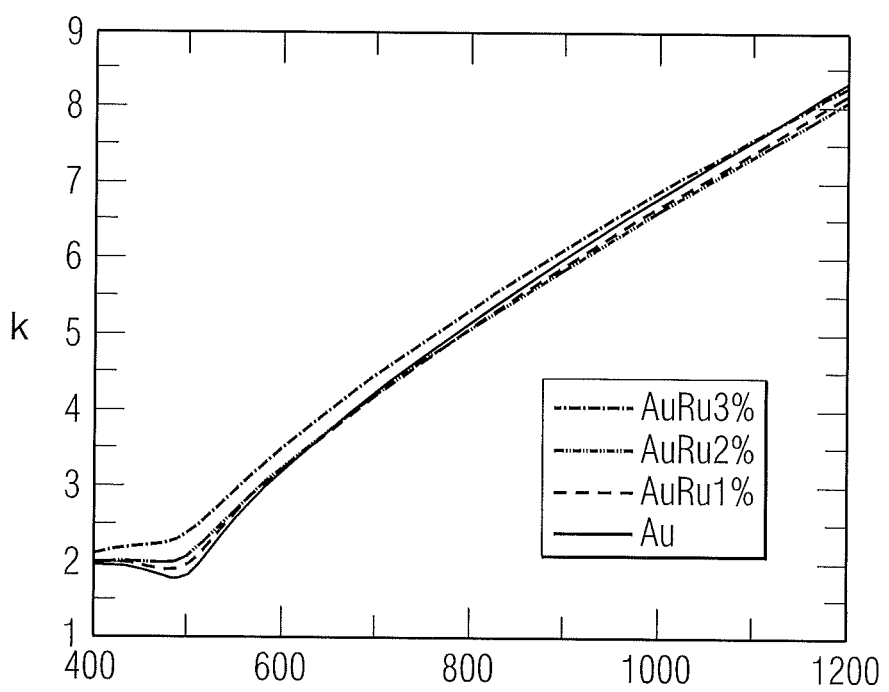

NFT materials must also possess optical properties that enable surface Plasmon resonance so that light energy that is incident on the NFT can be transferred to the storage medium. Optical refractive index (n) and extinction coefficient (k) values have been measured on Au films with various doping, as shown in FIGS. 14-19. FIGS. 14 and 17 show data for AuCu films. FIGS. 15 and 18 show data for AuRh films. FIGS. 16 and 19 show data for AuRu films. Considering the impact on NFT coupling efficiency, in some embodiments, the maximum doping levels have been determined to be 30% for Cu, 2% for Rh, and 1% for Ru.

Another embodiment uses oxide dispersion hardening. In one example, nano-sized (e.g., 1-5 nm) oxide particles were doped into Au films to enhance its mechanical property through oxide dispersion hardening. A dispersion of insoluble particles can harden a material because dislocation migration cannot pass the particles. Dispersion hardening from extremely stable particles, e.g. oxide or nitride particles, is the least sensitive to elevated temperatures compared to other hardening mechanisms. The nitride particles can include for example, Ta, Al, Ti, Si, In, Fe, Zr, Cu, W or B Nitride.

Another advantage here is that the insoluble oxide or nitride particles won't change the electric band structure, and thus the optical n and k, of Au. Au can be reactively sputtered with V or Zr to form $V_2O_5$ or $ZrO_2$ nanoparticles embedded in Au matrix. The deposition can be done through either reactive co-sputtering from multiple metal targets or reactive sputtering from an alloy target.

Table II shows the physical properties for Au and Au:$ZrO_2$. (from Jesse R. Williams, David R. Clarke, "Strengthening gold thin films with zirconia nanoparticles for MEMS electrical contacts", Acta Materialia 56, 1813 (2008)).

| Summary of measured physical properties | | | | |
|---|---|---|---|---|
| | Lateral grain size | Hardness (GPa) | Resistivity ($\mu\Omega$ cm) | Roughness (nm) |
| Gold-zirconia as-sputtered | 50 nm | 5.0 | 6.2 | 1.15 |
| Gold-zirconia annealed 500° C. | 50 nm | 3.8 | 4.5 | 1.26 |
| Pure gold as-sputtered | 100 nm | 2.7 | 4.0 | 2.11 |
| Pure gold annealed 500° C. | ~1 $\mu$m | 2.3 | 3.4 | 2.33 |

As summarized in previously published Table II, the micro structure of Au is stabilized by $ZrO_2$ doping. The average grain size in Au film increased from 100 nm to 1 $\mu$m after annealing at 500° C. for 60 hours, while in Au:ZrO films that have been through the same heat treatment, the grain size stay unchanged at 50 nm. As a consequence, the hardness of Au has been enhanced by 85% by introducing $ZrO_2$ nanoparticles into an Au matrix, in as-grown films. After annealing at 500° C. for 60 hours, the hardness of Au:$ZrO_2$ is still 65% higher than that of pure Au.

Figure 20:
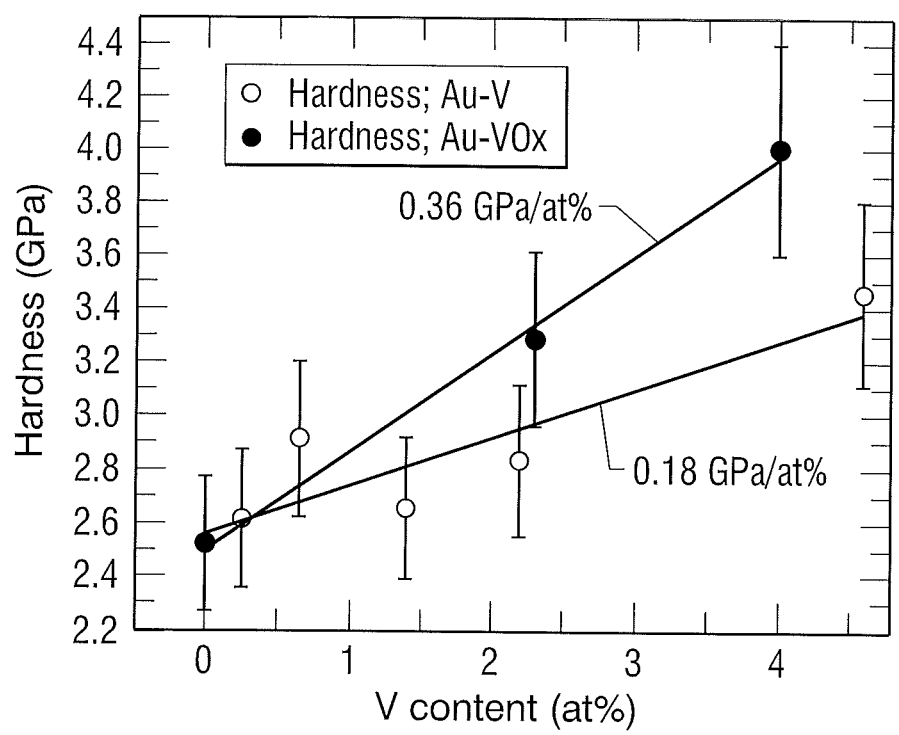
FIG. 20 is a graph of hardness versus vanadium content.
Figure 21:
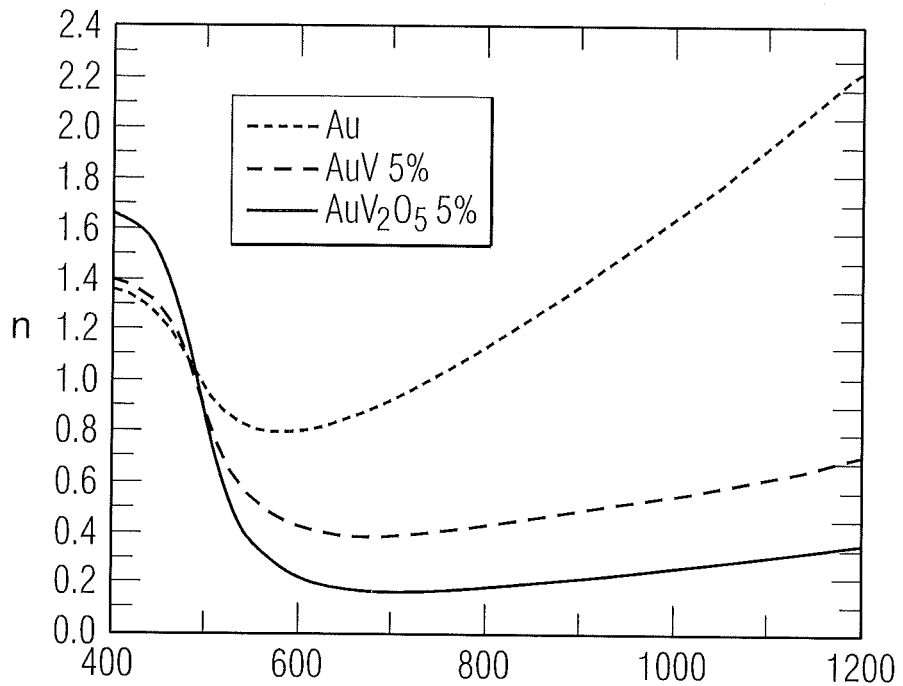
FIG. 21 is a graph of refractive index versus wavelength.
Figure 22:
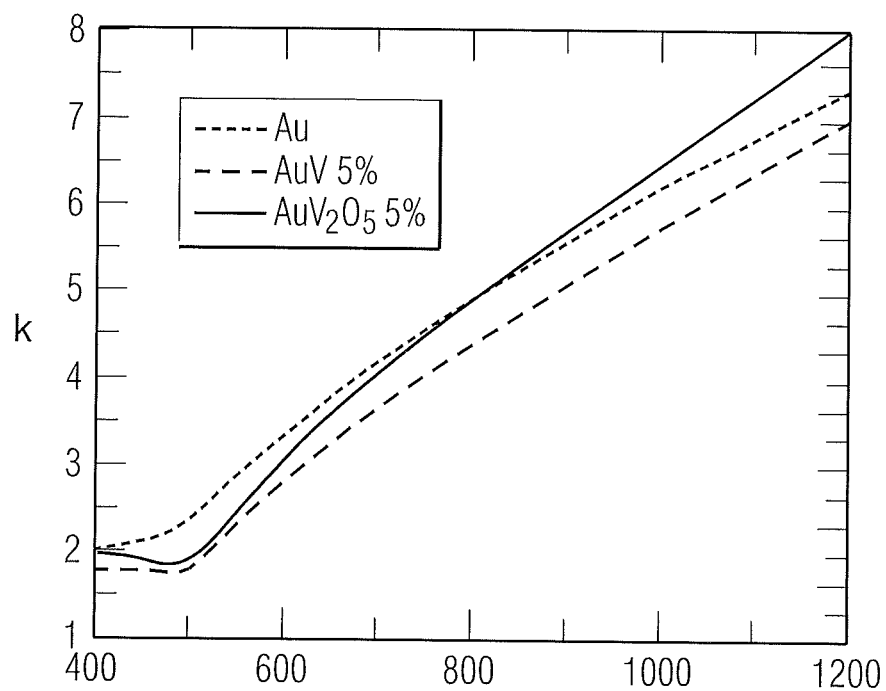
FIG. 22 is a graph of extinction coefficient versus wavelength.

Success in hardening Au with $V_2O_5$ nanoparticles has been reported by others. The hardness of Au has been enhanced by about 40% by introducing 5% $V_2O_5$ nanoparticles into Au matrix, as shown in FIG. 20 [from Thirumalesh Bannuru, Walter L. Brown, Suparut Narksitipan, and Richard P. Vinci, "The electrical and mechanical properties of Au—V and Au—$V_2O_5$ thin films for wear-resistance RF MEMs switches", Journal of Applied Physics 103, 083522 (2008)]. Optical n and k values have been measured on Au films doped with $V_2O_5$ nanoparticles, as shown in FIGS. 21 and 22. Considering the impact on NFT coupling efficiency, the maximum doping level has been determined to be 5%, which is large enough to provide a 40% hardness enhancement.

In other embodiments, the oxide dopant can comprise an oxide of at least one of: Mg, Ca, Al, Ti, Si, Ce, Y, Ta, W or Th. Examples of such oxides include: MgO, CaO, $Al_2O_3$, $TiO_2$, $SiO_2$, $CeO_2$, $Y_2O_3$, $Ta_2O_5$, $WO_2$ or $ThO_2$. When selecting an oxide, one might consider the energy needed to de-bond a material; and/or the solubility between the metal element in such particle with Au.

The near field transducers described above can be fabricated using a variety of techniques, including for example: sputtering from an alloy target; co-sputtering from multiple targets; reactive sputtering from an alloy target; reactive co-sputtering from multiple targets; co-evaporation from multiple sources; reactive co-evaporation from multiple sources; and ion beam deposition from an alloy target.

While the disclosure has provided several examples, it will be apparent to those skilled in the art that various changes can be made to the disclosed examples, without departing from the scope of the following claims. The implementations described above and other implementations are within the scope of the following claims.

What is claimed is:

1. An apparatus comprising:
   a near field transducer comprising gold and at least one of: nitride particles, oxide particles, or combinations thereof.

2. The apparatus of claim 1, wherein the nitride particles, oxide particles, or combinations thereof are nanoparticles.

3. The apparatus of claim 1, wherein the nitride particles, oxide particles, or combinations thereof have a size from 1 to 5 nm.

4. The apparatus of claim 1, wherein the near field transducer has a thickness in a range from 10 nm to 300 nm.

5. The apparatus of claim 1, wherein the near field transducer has a thickness in a range from 20 nm to 300 nm.

6. The apparatus of claim 1, wherein the near field transducer comprises nitride particles selected from Ta, Al, Ti, Si, In, Fe, Zr, Cu, W, or B nitride particles.

7. The apparatus of claim 1, wherein the near field transducer comprises oxide particles selected from V, Zr, Mg, Ca, Al, Ti, Si, Ce, Y, Ta, W, or Th oxide particles.

8. The apparatus of claim 1 further comprising a storage medium and a recording head, the recording head comprising the near field transducer and a waveguide configured to direct light onto the near field transducer; and an arm for positioning the recording head adjacent to the storage medium.

9. An apparatus comprising:
   a near field transducer comprising gold and oxide particles.

10. The apparatus of claim 9, wherein the oxide particles are nanoparticles.

11. The apparatus of claim 9, wherein the oxide particles have a size from 1 to 5 nm.

12. The apparatus of claim 9, wherein the oxide particles comprises an oxide of at least one of: V, Zr, Mg, Ca, Al, Ti, Si, Ce, Y, Ta, W, or Th.

13. The apparatus of claim 9, wherein the oxide particles comprises one of: $V_2O_5$, $ZrO_2$, MgO, CaO, $Al_2O_3$, $TiO_2$, $SiO_2$, $CeO_2$, $Y_2O_3$, $Ta_2O_5$, $WO_2$, or $ThO_2$.

14. The apparatus of claim 9, wherein the oxide particles comprise $ZrO_2$, $V_2O_5$, or combinations thereof.

15. An apparatus comprising:
    a near field transducer comprising gold and nitride particles.

16. The apparatus of claim 5, wherein the nitride particles are nanoparticles.

17. The apparatus of claim 15, wherein the nitride particles have a size from 1 to 5 nm.

18. The apparatus of claim 15, wherein the nitride particles comprises nitride particles selected from Ta, Al, Ti, Si, In, Fe, Zr, Cu, W, or B nitride particles.

19. The apparatus of claim 15, wherein the near field transducer has a thickness in a range from 10 nm to 300 nm.

20. The apparatus of claim 1 further comprising a storage medium and a recording head, the recording head comprising the near field transducer and a waveguide configured to direct light onto the near field transducer; and an arm for positioning the recording head adjacent to the storage medium.

\* \* \* \* \*